Oct. 10, 1950  S. C. LYONS  2,524,816
METHOD OF IMPROVING KAOLIN AND PRODUCTS THEREOF
Filed Feb. 21, 1946
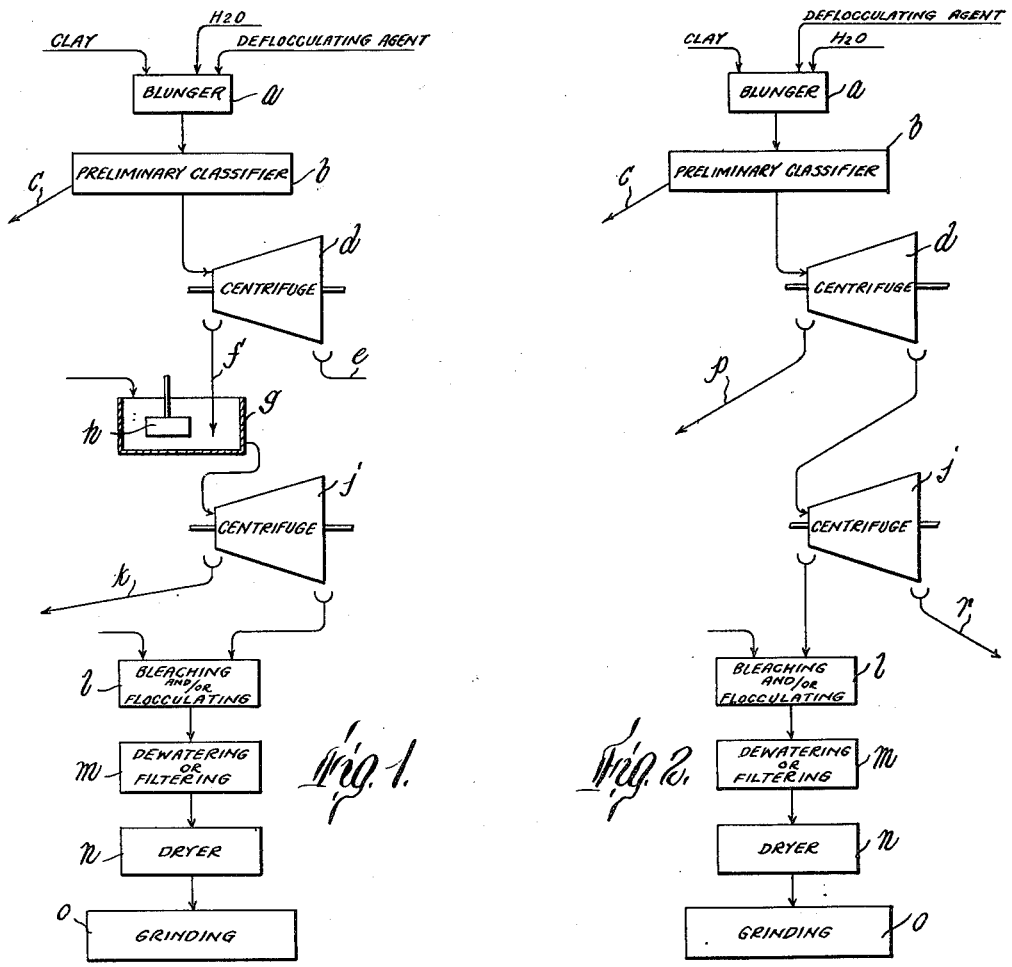
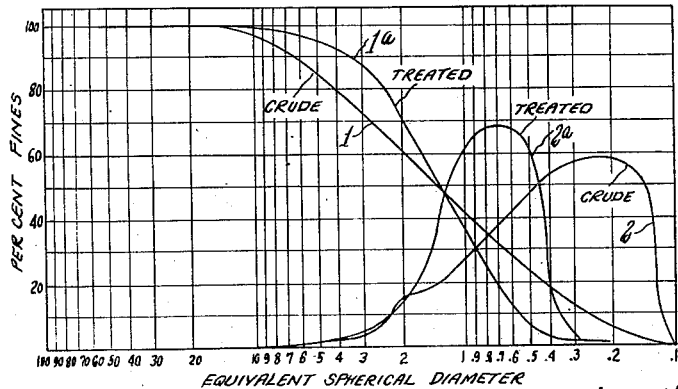

Patented Oct. 10, 1950

2,524,816

UNITED STATES PATENT OFFICE 2,524,816

METHOD OF IMPROVING KAOLIN AND PRODUCTS THEREOF

Sanford C. Lyons, Bennington, Vt., assignor to Bird Machine Co., Walpole, Mass., a corporation of Massachusetts Application February 21, 1946, Serial No. 649,294

10 Claims. (Cl. 23—110)

The present invention relates to the preparation of kaolin, including clays which natively exhibit high viscosity when in slurries, for use in the paper, ceramics, and paint industries, and other purposes wherein a coating film having high opacity or hiding power and gloss is desired. For example, clay is extensively used for coating paper destined for use in the making of books and periodicals where a smooth and opaque surface is needed to take the best impressions of type faces, half tone plates, etc. And in the coating of paper, wherein the clay is applied in aqueous suspension, manufacturing efficiency demands also that the coated product contain a minimum of water in order that it may be dried quickly and without impairment of the coating film in the drying procedure, and for satisfactory quality of coating the suspension or slurry must be of low enough viscosity to flow freely and deposit a smooth film. The same qualities are desirable in other industries also where a superior coating or surface of clay is needed; and in the manufacture of ceramic articles by molding where rapid and controlled drainage from the slurry in the molds is required. Some clays are excluded from use for the purposes indicated because their viscosities in suspensions of acceptable water contents are too high.

I have discovered that when the extremely fine particles, i. e., those finer than approximately .25 micron equivalent spherical diameter, are removed from the clays suitable for the purposes above indicated, a superior product is obtained, and the viscosity of the product, both in aqueous suspension and in the adhesive suspensions which are commonly used in paper coating processes, is markedly lower than that of the original material under similar circumstances. I have further found that the clay after removal of the fine particles is considerably whiter than the original clay, and the slightly brownish stain apparent in the untreated clay is almost completely removed.

In the light of the foregoing, the purpose of the invention may be considered to be that of improving kaolin by reducing its viscosity in suspensions, eradicating objectionable color, and accomplishing these results without reducing the gloss and hiding power of the clay when applied as a film. A part of this object is to make usable, in the industries referred to, some clays that are not now acceptable. The invention comprises broadly the procedure and result of removing from clay substantially all particles finer than approximately .25 micron equivalent spherical diameter; and it further includes the removal of grit and other foreign matter, and also clay particles of larger than permissible dimensions for the industrial purpose in view, when such foreign matter and large particles occur in the crude clay from which the final product is to be obtained.

In carrying out the procedure I preferably first make a slurry of the crude clay by any of the conventional blunging methods, in which the suspended matter is put in a deflocculated state by the judicious addition of any of the known dispersing agents. I have generally employed a polymeta-phosphate, such as sodium hexametaphosphate, the chemical formula of which is $(NaPO_3)_6$. The slurries so obtained may be given first a preliminary degritting treatment to remove mica, grit or other coarse and objectionable material that may be present. They may also be given classifying treatments to obtain desired properties of gloss and hiding power, etc. After these preliminary treatments, and while still in deflocculated fluid suspension, the slurries are subjected to settling forces, as by being passed through a continuously operating centrifuge, under conditions which cause rejection of excessively fine particles by discharge with the effluent and retention of the particles comprised within the acceptable size range by sedimentation. Particles of larger than suitable diameters, when present, may be separated by similar means. Thereafter the separately concentrated particles of suitable dimensions may be given any of the known further beneficial treatments such, for example, as chemical bleaching, rinsing, filtration, drying, pulverizing or grinding, etc. The rejected fractions of the raw material may either be discarded, or be combined with other grades of clay wherein viscosity and other properties are not objectionable, or may be separately recovered for such applications as their qualities adapt them.

The drawings furnished herewith show in diagrammatic manner apparatus suitable for performing the steps above outlined and furnishing the desired product; and also the results of treating specific samples of kaolin. In these drawings—

Fig. 1 is a diagram of all the parts of apparatus by which a dry pulverized product containing only particles between optimum limits of equivalent diameter may be obtained from crude kaolin;

Fig. 2 is a similar diagram showing permissible minor variations in the order of steps performed and parts of apparatus used in carrying out the procedure;

Fig. 3 is a plot showing graphically the results of treating a specific clay by my procedure.

In both Figs. 1 and 2, $a$ represents a blunger of any suitable character into which crude clay is fed together with water and a small percentage of a deflocculating or dispersing agent such as sodium hexametaphosphate, and in which the clay is transformed into a well dispersed slurry; the relative proportions of clay and water being preferably such that the resulting slurry will contain in the order of 20% to 45% solid matter. The slurry is discharged from the blunger into a preliminary classifier $b$, in which sand, mica and other coarse grit is separated from the clay in suspension. The coarse material is discharged to waste, as indicated by the arrow $c$, and the slurry is conducted to a continuously operating centrifuge $d$. In the arrangement shown in Fig. 1, the fraction of the suspended matter which consists of particles finer than approximately .25 micron in equivalent spherical diameter is discharged to waste, or for further treatment, if desired, through a conduit $e$, while the fraction containing all the coarser material is delivered through conduit $f$ to a tank $g$, in which it may be diluted and further dispersed by added water and deflocculating agent by means of an agitator $h$. The slurry from the tank $g$ may be passed to a second centrifuge $j$, in which a further separation is made between particles of suitable sizes and other particles which are too coarse for the purpose in view; the coarse fraction being discarded at $k$ to waste or for further processing, and the usable fraction being delivered to a tank $l$ containing a bleaching agent or a flocculating agent, or agents of both classes. From the tank $l$, the slurry passes to a dewatering or filtering device $m$, the dewatered clay is dried in a drier $n$, and the dried clay may then be pulverized in a grinding mill $o$, or other suitable means.

The apparatus diagrammatically represented in Fig. 2 differs from that in Fig. 1, in that the centrifuges are arranged for delivery of all of the clay, except the fraction which is too coarse for use, from the first centrifuge to the second, the coarse material being discharged at $p$; while the second centrifuge discards the material finer than about .25 micron at $r$ and delivers the usable clay to the bleaching or flocculating apparatus. The subsequent steps and parts of apparatus are the same as represented in Fig. 1.

Where the crude clay contains no particles of excessively large diameter, the step of separating and discarding coarse particles may be omitted and a single step only of separation may be employed, namely, that which eliminates excessively fine particles from the slurry. It has been demonstrated, however, that clay which contains no particles, or no more than a small fraction of particles, coarser than about 3 microns, has much superior properties as a coating material in respect to both gloss and opacity than fractions of the same clay composed predominantly of coarser particles, even though such coarser particles are no larger than 10 microns equivalent spherical diameter. Hence in general, it is preferable to separate both coarse and fine particles and obtain as the final product kaolin of which the particle size range is within the optimum limits of about .25 micron and 3 microns.

Also the further steps performed on the retained kaolin may be varied from those above described as required by conditions of use and sale. That is, for example, the step of grinding, or both drying and grinding as steps of a continuous procedure at the same mill may be omitted.

The following table shows comparatively the relative proportions of particles of specific diameters in an illustrative sample of crude clay and in another sample of the same clay after treatment to eliminate substantially all, and only, the particles smaller than .25 micron.

| Crude Clay | After Treatment |
|---|---|
| | Per cent |
| Finer than 30 microns 100% | 100 |
| Finer than 20 microns 100% | 99.8 |
| Finer than 10 microns 97% | 98 |
| Finer than 5 microns 84% | 95 |
| Finer than 3 microns 72% | 85 |
| Finer than 2 microns 61% | 71 |
| Finer than 1 micron 41% | 36 |
| Finer than 0.8 micron 36% | 25 |
| Finer than 0.7 micron 33% | 19 |
| Finer than 0.6 micron 29% | 13 |
| Finer than 0.5 micron 24% | 7 |
| Finer than 0.4 micron 19% | 2.2 |
| Finer than 0.3 micron 13% | 1.6 |
| Finer than 0.25 micron 10% | 1.0 |
| Finer than 0.2 micron 7% | .3 |
| Finer than 0.15 micron 4% | 0 |
| Finer than 0.10 micron 1% | 0 |

From the foregoing table it is evident that in the treated sample of clay, the particles in the range between 10 microns and 3 microns inclusive constitute 13%, and the particles smaller than 3 microns and including those of .25 micron and all intermediate sizes constitute 84%, of the whole quantity; and also that particles of all sizes smaller than 2 microns and including .25 micron constitute 70% of the whole.

The same comparison is shown by the curves in Fig. 3, wherein the curve $I$ shows the percentages by weight of different particle sizes in the crude clay, and the curve $Ia$ shows corresponding values in the treated clay. The ordinates of these curves designate percentages and the abcissae designate equivalent spherical diameters of the particles. The curves $2$ and $2a$ show the relative particle size distribution by frequency of the crude clay and the treated clay, respectively.

The mode of determining particle sizes and the meaning of the term "equivalent spherical diameter" used in this specification are explained as follows. Extremely fine particles, those in the order of one micron diameter and smaller, cannot be seen or measured by visual inspection through any optical microscope. Although with the aid of the electron microscope it is possible to photograph particles perhaps finer even than .1 micron, yet the extreme magnification required for that purpose limits the size of any sample capable of being examined by electron microscopic methods to such small dimensions that quantitative evaluation of the particle size distribution of extremely fine particles is impracticable.

Therefore recourse is had to the method of Stokes, the so called Stokes law. In its most elementary form, the Stokes law states that the settling rate of finely divided particles in fluid suspension is proportional to the squares of their diameters. This formula was developed with reference to particles of spherical shape, and it is only to such particles that the formula strictly applies.

It hardly needs saying that the shape of clay particles is definitely not spherical. However, it has been repeatedly demonstrated that as particles of any shape become finer and finer, their subsidence characteristics or settling rates become closer to those of spheres; and it has become common practice to report the diameters of very finely divided particles in terms of equivalent spherical diameter determined by this Stokes method. A desciption of the application of the method to clay has been published by F. H. Norton and S. Speil, entitled "Measurement of Particle Size in Clay," in the Journal of the American Ceramics Society, volume 21 (3), pages 89–97. This volume was published in 1938.

Hence reference in this application to a one micron particle, for instance, means a particle whose subsidence rate is equivalent to that of a spherical particle of one micron diameter. Parenthetically, it might be mentioned that clay particles whose dimensions have been determined by this method and which also have been photographed by electron photo micrographic methods bear an extremely close corelationship.

Viscosity determinations made upon samples of clay prior to separation of the fine particle fraction, and on the effluent fine material, have shown that the fine material is of much greater viscosity both in aqueous suspension and in the adhesive suspensions which are commonly used in paper coating processes, than is the untreated clay in similar suspensions. It appears that segregation of the fine material also accomplishes a marked concentration of the elements originally present in the crude material which cause viscosity. There is a critical feature associated with particles of about .25 micron equivalent spherical diameter, in that particles slightly finer than that diameter exhibit an increase in viscosity far out of proportion to the difference in particle size. On the other hand, while there is generally a reduction in viscosity of suspensions of particles coarser than .25 micron, the progressive decrease in viscosity with larger particles is relatively very small as compared with the increase of viscosity with particles progressively finer than .25 micron. Determinations of viscosity with different rates of shear have shown the following results expressed in centipoises.

|  | 10 R. P. M. | 20 R. P. M. | 50 R. P. M. | 100 R. P. M. |
|---|---|---|---|---|
| Original Clay | 40,000 | 20,800 | 9,120 | 4,800 |
| Treated Clay | 640 | 520 | 336 | 232 |

Expressed in percentages, the viscosity of the treated clay ranges from only 1.6% to 4.8% of the original clay at rates of shear from 10 R. P. M. to 100 R. P. M.

The reduced viscosity is of the utmost importance in the commercial production of coated paper, for it enables the clay to be spread smoothly when applied in a slurry containing much less water than has been necessary heretofore, and the small content of water enables the coated paper to be dried in standard paper driers at acceptable rates of speed without liablity to injury of the coating.

A surprising improvement in the paper coating qualities of the clay treated in accordance with this invention is that the hiding power and gloss are at least as good as the like properties of the original untreated clay. A further unexpected result is that the treated clay is considerably whiter and brighter than the original clay, and very much whiter than the fine particle fraction that has been removed.

Other results of the practice of the invention are that clays so treated make paints that are more easily applicable by brushing and prevent formation of brush marks; and that the treated clays in slurries suitable for making ceramic articles by molding exhibit desirable properties of rapid and controlled drainage.

The kaolins which I have mainly used in the development of this invention are those found in the central region of the States of South Carolina, Georgia and Alabama; and of these I prefer the clays found in the Twiggs County, Wilkinson County, and Washington County District of Georgia. However, the invention is not limited in its scope of application to those particular kaolins, but may be applied advantageously to all clays which are suitable for coating paper and for the other industrial purposes indicated.

What I claim is:

1. The method of treating clay to obtain a whiter, brighter and less viscous product than the original clay and one which is suitable for coating paper with adequate hiding power and for other industrial uses, which comprises mixing the clay with water and a dispersing agent to form a well dispersed suspension, and progressively subjecting the suspension to two continuously operating controlled precipitating treatments, one of such treatments consisting in the application of settling force sufficient to precipitate from the suspension substantially all particles larger than a maximum size range of from 10 to 2 microns equivalent spherical diameter and the removal of such precipitated particles from the zone of sedimentation, and the other of such treatments being the application of centrifugal settling force sufficient to separate and remove from the suspension substantially all remaining particles except those smaller than .25 micron with discarding of substantially all particles smaller than .25 micron.

2. The method set forth in claim 1, combined with the further step of bleaching the fraction which comprises particles of all sizes between the said maximum size range and the minimum size of .25 micron.

3. The method set forth in claim 1, combined with the further step of drying the fraction which comprises particles of all sizes between the said maximum size range and the minimum size of .25 micron.

4. The method of treating clay to obtain a product that is whiter, and less viscous in aqueous suspensions than the clay treated, and is suitable for coating paper with adequate hiding power, and for other industrial uses, which comprises blunging the clay with water and a minor propertion of a deflocculating agent, removing foreign impurities, and classifying the slip in successive operations with intermediate resuspension of the retained fraction; one of said classifying operations consisting in removing by applied precipitating force, and discarding, substantially all particles coarser than those in a range of from 10 microns to 2 microns equivalent spherical diameter, and the other of such classifying operations consisting in removing from the suspension by centrifugal precipitating force, substantially all particles larger than, and including those of, .25 micron equivalent spherical diameter while discarding substantially all of the particles finer than .25 micron; retaining as the end product all particles between the minimum size of .25 micron and the maximum size range of 10 to 2 microns.

5. The method of making a new and improved clay product for industrial use, which comprises the steps of suspending clay in water, deflocculating the clay suspension so produced, eliminating from the suspension particles of grit and other foreign matter which may be present, classifying the suspension to develop suitable properties of hiding power and gloss by eliminating therefrom substantially all of the particles therein which are larger than those in a range of from 10 microns to 2 microns equivalent spherical diameter while retaining in suspension substantially all other particles, and further treating the partially depleted suspension by centrifuging to cause removal from the suspension of substantially all particles of .25 micron equivalent spherical diameter and larger, within the maximum size limit of 10 to 2 microns and causing substantially all of the particles finer than .25 micron to be floated away; the fraction composed of the particles so removed from suspension constituting the product sought.

6. The method of treating clay to obtain a material which is whiter and brighter and less viscous in aqueous suspensions that the original clay, and possesses adequate hiding power and gloss for coating paper, which comprises progressively passing a slurry composed of water, clay and a dispersing agent at a controlled rate of feed into a continuously operating centrifuge, rotating such centrifuge at a rate such as to discharge in the effluent suspension substantially all particles finer than .25 micron equivalent spherical diameter, separately discharging the clay of larger particle sizes from the centrifuge; resuspending the latter fraction of clay with water, passing the suspension to a second continuously operating centrifuge, and operating the second centrifuge at a rate such as to separate and retain substantially all particles of .25 micron equivalent spherical diameter, and larger within a maximum particle size range of 2 to 10 microns from the remainder of the clay, while eliminating substantially all particles larger than such maximum size range.

7. A material suitable for use in paper coating and other purposes having enhanced whiteness and low viscosity in aqueous suspension, consisting of a clay containing particles of all sizes from about 10 microns to .25 micron inclusive and being substantially free from particles larger than 10 microns and smaller than .25 micron equivalent spherical diameter.

8. A material for use in paper coating and for other purposes having adequate hiding power and low viscosity when in aqueous suspension, consisting of clay of which the particles are nearly all within the limits of 3 microns and .25 micron equivalent spherical diameter and include particles of all sizes between those limits.

9. A clay product adapted for coating paper having improved whiteness and low viscosity in aqueous suspension, consisting of clay which has passed through a progressive treatment of controlled precipitation from liquid suspension and from which substantially all particles smaller than .25 micron and larger than a maximum particle size range of 10 to 2 microns equivalent spherical diameter have been removed, and in which substantially all particles of sizes between and including 2 microns and .25 micron have been retained.

10. A clay product adapted for use in coating paper having improved whiteness and low viscosity when in aqueous suspension, consisting of clay which has passed through a progressive treatment of controlled precipitation from liquid suspension and from which substantially all particles smaller than .25 micron and larger than a maximum particle size of 3 microns equivalent spherical diameter have been eliminated and in which substantially all particles of sizes smaller than 3 microns to and including .25 micron have been retained.

SANFORD C. LYONS.

REFERENCES CITED

The following references are of record in the file of this patent:

UNITED STATES PATENTS

| Number | Name | Date |
|---|---|---|
| 61,338 | Hover | Jan. 22, 1867 |
| 2,085,538 | Lyons | June 29, 1937 |
| 2,158,987 | Maloney | May 16, 1939 |
| 2,179,154 | Lyons | Nov. 7, 1939 |
| 2,249,570 | Lane | July 15, 1941 |